(12) United States Patent
Roesgen et al.

(10) Patent No.: US 9,861,924 B2
(45) Date of Patent: Jan. 9, 2018

(54) FILTER ELEMENT AND FILTER SYSTEM

(71) Applicant: Mann+Hummel GMBH, Ludwigsburg (DE)

(72) Inventors: André Roesgen, Remshalden (DE);
Robert Hasenfratz, Waiblingen (DE);
Fabian Wagner, Moeglingen (DE);
Christian Thalmann, Speyer (DE);
Frank Pflueger, Sachsenheim (DE);
Leos Burda, Domasov U Brna (CZ);
Michal Tuma, Hlinsko v Cechach (CZ); Vit Wognar, Ivancice (CZ)

(73) Assignee: MANN+HUMMEL GmbH, Ludwigsburg (DE)

( * ) Notice: Subject to any disclaimer, the term of this patent is extended or adjusted under 35 U.S.C. 154(b) by 200 days.

(21) Appl. No.: 14/840,325

(22) Filed: Aug. 31, 2015

(65) Prior Publication Data
US 2016/0230714 A1    Aug. 11, 2016

(30) Foreign Application Priority Data
Aug. 29, 2014    (DE) .................. 10 2014 012 578

(51) Int. Cl.
| | | |
|---|---|---|
| *B01D 46/24* | (2006.01) | |
| *F02M 35/02* | (2006.01) | |
| *F02M 35/024* | (2006.01) | |
| *B01D 46/00* | (2006.01) | |

(52) U.S. Cl.
CPC ..... *B01D 46/2414* (2013.01); *B01D 46/0005* (2013.01); *F02M 35/0203* (2013.01); *F02M 35/024* (2013.01); *F02M 35/02416* (2013.01); *F02M 35/02483* (2013.01); *B01D 2265/021* (2013.01); *B01D 2265/06* (2013.01); *B01D 2271/027* (2013.01)

(58) Field of Classification Search
CPC ............ B01D 46/0005; B01D 46/0024; B01D 46/2414; B01D 2265/021; B01D 2265/06; B01D 2271/027; F02M 35/0203; F02M 35/024; F02M 35/02416; F02M 35/02483
See application file for complete search history.

(56) References Cited

U.S. PATENT DOCUMENTS

| | | | | |
|---|---|---|---|---|
| 2002/0112459 | A1* | 8/2002 | Andress | ............. B01D 46/0024 55/498 |
| 2013/0263744 | A1 | 10/2013 | Osendorf et al. | |
| 2014/0102058 | A1* | 4/2014 | Kaufmann | ......... B01D 46/0004 55/482 |

FOREIGN PATENT DOCUMENTS

| | | |
|---|---|---|
| DE | 102004005210 A1 | 8/2005 |
| DE | 102012211185 A1 | 1/2014 |

* cited by examiner

*Primary Examiner* — Robert Clemente
(74) *Attorney, Agent, or Firm* — James Hasselbeck

(57) ABSTRACT

The invention relates to a filter element (10) that includes a filter body (12) that has a longitudinal axis (L) and that is arranged between a clean side (50) and a raw side (52) of the filter element, and at least a first end disk (16) arranged on an end face (15) of the filter body (12). The end disk (16) has a sealing arrangement (22) for sealing between the clean side (50) and the raw side (52). The sealing arrangement (22) furthermore has a radially sealing sealing area (23) and a separate retaining area (20) that acts as a movable bearing. The invention further relates to a filter system (100) for exchangably installing such a filter element (10).

13 Claims, 9 Drawing Sheets

FILTER ELEMENT AND FILTER SYSTEM

TECHNICAL FIELD

The invention relates to a filter element having a sealing area and a retaining area, especially for use as an air filter in an internal combustion engine, and to a filter system for installing such a filter element.

BACKGROUND OF THE INVENTION

Using air filters for filtering combustion intake air for internal combustion engines in motor vehicles, e.g. passenger cars, utility vehicles, working vehicles, vehicles for agriculture, as well as stationary generators and the like, is known. Such air filters generally include a housing, an air inlet, and an air outlet, wherein a removable and exchangeable primary filer element is arranged in the housing. Frequently, the housing includes a maintenance or access cover for access to the filter element housed in the interior in case maintenance is needed. To this end the filter element may be unmounted and either replaced by a factory-new filter element, re-furbished and re-used, or exchanged for a previously used but re-furbished filter element.

An air filter system that has an air filter housing and a serviceable air filter element is known from DE 20 2008 018 217 U1. The serviceable air filter element is positioned operationally ready within a housing interior. The air filter element has a filter body that extends between first and second closure caps. The filter body surrounds and defines an open filter interior. The first closure cap is an open closure cap that has an air flow aperture therethrough. The second closure cap is a closed closure cap that has an outer end surface. A housing seal arrangement is provided on the first closure cap and is designed to seal the air filter element against the air filter housing and to hold the air filter element in the housing. A projection/receiver arrangement is provided as a further retaining device that includes the first and second elements.

A first element of the projection/receiver arrangement is positioned on the outer end surface of the second closure cap. It is to be caused to engage with the access cover in a defined manner. A second element of the projection/receiver arrangement is positioned on the access cover. It has a serpentine ring element and may be either a ring projection or an annular receiver groove. The first and second elements of the projection/receiver arrangement are disposed engaged with one another to provide fixed retention of the air filter element on the second end. The first and second elements of the projection/receiver arrangement are non-rotatably engaged.

Normally the filter elements of air filters are exchanged after a certain operating period. Depending on how much dust there is, the service life for an air filter may be a few days, for instance in construction vehicles, up to several months in surroundings that are less dusty.

Reliable and trustworthy sealing of the filter element in a housing is important, especially when filter elements are exchanged frequently. The seal should be temperature-resistant and shake-proof. The seal for the filter element must be assured, even in systems or devices that are subjected to strong vibrations or shocks. At the same time, however, to the extent possible the filter element itself should not have any metal elements so that it is possible to remove heat from it with no problem.

BRIEF SUMMARY OF THE INVENTION

One object of the invention is therefore to create a filter element having a reliable seal between the area of the unfiltered fluid and the area of the filtered fluid, which seal ensures secure mountability, especially when exchanging the filter element during maintenance.

Another object of the invention is to create a filter system for receiving such an exchangeable filter element having a reliable seal and secure mountability.

According to one aspect of the invention, the aforesaid objects are attained by a filter element that includes a filter body and at least one end disk, wherein the end disk has a sealing arrangement with a radially sealing seal area and a separate retaining area that acts as a movable bearing.

Advantageous embodiments and advantages of the invention result from the other claims, the description, and the Figures.

A filter element is suggested that includes a filter body having a longitudinal axis that is arranged between a clean side and a raw side of the filter element and that also includes at least a first end disk arranged on an end face of the filter body. The end disk has a sealing arrangement for sealing between the clean side and the raw side. The sealing arrangement furthermore has a radially sealing sealing area and a separate retaining area that acts as a movable bearing.

When being installed in a housing, the filter element may be radially centered and/or supported via the retaining area. Due to the embodiment of the retaining area as a movable bearing, the filter element may move axially in this bearing even after being installed in the housing so that production tolerances may be compensated, vibrations may have a less damaging effect on the filter medium, and even changes in lengths during operation, for instance due to water absorption, may also be compensated. Changes in length in the range of several millimeters, for instance typically +/-4 millimeters, may be able to be tolerated because of this. The retaining area may advantageously be positioned against an interior counter-surface of the housing wall and thus may also be supported radially. The movable bearing extends radially and may in particular be formed from individual retaining elements that extend radially.

Advantageously, the sealing arrangement with the sealing area and the retaining area may be arranged on one end face of the filter element, which end face also represents the outlet for the filtered fluid from the interior area of the filter element on the clean side. This end face of the filter element may first be introduced into the housing of a filter system and thus seal the clean side of the filter system against the raw side when the sealing area is positioned against the housing. Positioning the retaining area against the housing represents a movable bearing. In this case, the second end face of the filter element may have an end disk that represents a fixed bearing when the housing is closed using a cover and also seals the clean side from the raw side of the filter element against the housing. In one alternative embodiment, however, the outlet side end face of the filter element may represent a fixed bearing and the opposing end face, which is positioned for instance against the interior side of a cover, may have an inventive sealing area and a retaining area and thus may represent a movable bearing. In another alternative embodiment, it is also possible for an inventive sealing area and inventive retaining area to be disposed at opposing end faces of the filter element.

In contrast to the use of end disks made of polyurethane foam, in which the functions of sealing and retaining are normally combined, separating the functions of sealing area and retaining area via a position-oriented sealing/retaining geometry into just sealing and just retaining has the advantage that the sealing of the filter element is effectively unloaded and in addition both functions may be favorably designed because it is possible to select different materials. Even if the thin-lip geometry of the seal is stressed, the path of vibrations may be limited by retaining elements of the retaining area. In the retaining area, using finger-like retaining elements that extend outward radially permits the filter element to be mounted in the housing in a position-oriented manner so that it can no longer turn during operation after it is installed.

Advantageously, the sealing area may have a circumferential seal that includes at least one sealing lip, so that, when being installed in a housing, the clean side of the filter element may be sealed against the raw side. The reliable seal between the area in which the unfiltered fluid flows and the area in which the filtered fluid flows is a fundamental requirement for a functioning filter system. It is useful to add a plurality of sealing lips at intervals in the millimeter range in order to provide particularly reliable sealing; typically, three sealing lips, for instance, may be selected in the form of a three-chamber seal. The seal may be oriented radially inward and radially outward and is merely dependent on the arrangement of a sealing surface on the housing wall.

In one advantageous embodiment, the retaining area may have at least one retaining element with a support element and a buffer element. The retaining element also facilitates positioning when the filter element is installed in the housing, which can no longer rotate after installation. An end area of the filter element, for instance opposing the outlet area of the fluid on the clean side, is securely borne in the housing; the retaining area securely fixes the filter element in the housing and during operation retains it such that longitudinal tolerances and longitudinal extension for instance due to moisture absorbance may be compensated. The actual retaining function is advantageously assumed by the retaining element via a support element and a damping function is provided by a buffer element attached thereto. The retaining element may usefully run radially outward in a finger-like manner from a collar, which collar is attached to the end disk about the longitudinal axis of the filter system and that creates the sealing area of the filter element, and may be positioned against a counter-surface on the housing wall of the filter system. Damping of the retention of the filter element in the housing is advantageous because when the filter system is operating, especially on an internal combustion engine, and most especially when operating in a motor vehicle, vibrations may occur that may lead to premature wear of the filter element and/or failure of the sealing effect of the seal of the filter element. The retaining elements may also pre-fix the filter element in the housing so that the mounting process, like the insertion of the filter element into the housing, wherein forces in the range of 4 to 5 kilonewtons may occur, may be much simplified. Usefully, if an arrangement of a plurality of retaining elements is distributed on the circumference of the retaining area, a minimum number of three retaining elements that are arranged at intervals of 120° is advantageous. In this manner the filter element may be inserted into the housing in a pre-centered manner. Even more advantageous is a number of five retaining elements that are equally distributed on the circumference. This permits the mounting of the filter element to be much simplified when it is inserted into the housing by pre-centering the filter element.

The buffer element may advantageously be designed such that it may accommodate filter element masses that may typically be up to 8 kg, given up to 5 kg of dirt picked up, and may dampen vibrations that may typically be 5 times gravitational acceleration in the vehicle range and at peaks may be up to 10 times gravitational acceleration.

The buffer element may usefully be arranged on a free, radially-extending end of the at least one retaining element. In this manner the buffer element may provide damping when positioned against a housing part, such as for instance a counter-surface of the housing wall, and thus may effectively protect the filter element from vibrations.

In one advantageous embodiment, therefore, the buffer element may include an interior chamber for damping when the buffer element is positioned against a counter-surface provided in the radial direction. In addition to the selected material, such a chamber may use compressible air in the interior of the chamber to provide a precisely defined damping effect that permits a precisely defined damping effect to be set using knowledge of the material parameters of the material used.

Usefully, the at least one retaining element may also include damping elements in the axial direction. In addition to the damping effect of the buffer elements, which act essentially radially, such damping elements, which may advantageously be arranged on the side facing the cover, may also perform an effective damping function axially when positioned against a housing wall or the cover, so that the filter element is effectively protected, even when acted upon axially.

Advantageously, the retaining area may have retaining elements with different lengths axially and/or radially. Different geometries, such as lengths in the embodiment of the retaining elements, permit a defined position of the filter element to be assured during mounting in the housing so that, in accordance with the poka-yoke principle, the filter element cannot be installed in the wrong position. In addition, when the filter element is always in the same defined position in the housing, the flow in a filter system may also always be adjusted in a reproducible manner, which is very significant, for instance, for the quality of a measurement using air mass sensors like the hot-film mass air-flow sensor (MAF sensors) known in the passenger vehicle industry.

Advantageously, the at least one end disk and the support element may be formed from a hard plastic and the buffer element and damping elements may be formed from an elastomer. In this manner the retaining function may be performed using the relatively hard elements while softer materials are advantageous for the buffer and damping functions. Typically polypropylene, polyamide, polyethylene, preferably fiberglass-reinforced, typically with up to 20 to 30 percent by volume fiberglass portion, may be used for the hard plastic. Normally thermoplastic elastomers are used for the elastomers. Polyurethane materials may also be used advantageously. The seals of the filter element also usefully comprise elastomers. Usefully, the end disks are joined to the filter body using butt-welding with heat reflectors.

It is also advantageous when the sealing area has a linear increase in force as the pressing force increases so that tolerances may be compensated and a reliable, long-lasting sealing effect is provided. Typical tolerances are in the millimeter range.

In contrast, the retaining area may advantageously have a progressive increase in its retaining force. Because of this the counterforce from the retaining elements increases disproportionately as excursion from the rest position increases. In this manner the sealing area is unloaded in its tolerance end positions and is not loaded beyond the stop.

In one alternative embodiment, the retaining elements may also be supported axially against an interior housing contour so that the filter element experiences additional axial support during vibrations and can better absorb vibrations.

Such an arrangement may be advantageous particularly when using relatively soft and damping materials for the retaining elements.

In one advantageous embodiment, the filter body may comprise, for instance, a filter bag folded in a zig-zag pattern (pleated) and may be embodied closed annularly. The folds may be produced, for example, using knife folds, for longer filter bodies, or using rotation folds. The filter bellows may comprise, for instance, paper or cellulose or a mixed fiber made of plastic and cellulose. The filter bellows may be embodied with a smooth surface, rolled, and/or with a surface that has various embossing for stiffening and/or for creating chambers for dust deposits. The filter bellows may have a coating and/or be impregnated in order to repel moisture. Alternatively, it may also be coated with nanofibers. The filter body may furthermore be structurally stiffened with a thread lap. The use of these materials for the filter medium represents a very economic option for realizing such a filter element. At the same time, the configuration described offers a stable arrangement so that the filter body is a self-supporting structure and thus provides an advantageous mounting property.

The filter element may usefully be used as an air filter, in particular an air filter for an internal combustion engine. Reliable operation of internal combustion engines is based on reliably and favorably filtering the intake air for combustion. The described filter element represents an economic option for this.

Likewise advantageous is the use of the filter element as a particle filter, especially as a particle filter for an internal combustion engine. In this case as well, reliable mounting and economic exchangeability of the described filter element are extremely important.

In accordance with a further aspect, the invention relates to a filter system having a filter element that includes a housing with housing wall and with a cover, wherein the interior of the housing wall in the radial direction has a counter-surface for positioning a retaining element of the filter element. The filter system furthermore includes an inlet arranged on the housing that is for supplying the fluid to be filtered, especially air, and an outlet arranged on the housing that is for removing the filtered fluid. The filter element includes a filter body with a longitudinal axis that is arranged between a clean side and a raw side, as well as at least a first end disk arranged on an end face of the filter body, wherein the end disk has a sealing arrangement for sealing between the clean side and the raw side. The sealing arrangement furthermore has a radially sealing sealing area and a separate retaining area that acts as a movable bearing, wherein retaining elements arranged on the retaining area may be positioned radially supportable against the counter-surface of the housing wall. In addition, the filter element is exchangeably arranged in the housing of the filter system.

The essential advantage of such a filter system is found in the reliable and stable mounting of the filter element and in very economical exchangeability of the filter element if service is needed. Rapid exchangeability is extremely important, especially in the case of short service lives, as may occur when using agricultural and construction vehicles.

In accordance with another embodiment of the invention, a secondary element may be arranged on the clean side of the filter element. The secondary element, which may comprise a bearing structure that is lined with a permeable filter medium, for instance a non-woven material, has the task of continuing to keep the outlet of the filter system closed when the filter element is exchanged so that no dirt can penetrate into this area while the filter element is being cleaned or reconditioned. In a preferred embodiment, the secondary element is joined to the housing via a screw connection and is provided with a seal against the housing.

BRIEF DESCRIPTION OF THE SEVERAL VIEWS OF THE DRAWING

Additional advantages result from the following description of the figures. The figures depict exemplary embodiments of the invention. The figures, the description, and the claims include numerous features in combination. The person skilled in the art will usefully also consider the features individually and combine them to create useful additional combinations.

Depicted as examples.

DETAILED DESCRIPTION OF THE INVENTION

Identical or similar components in the figures have the same reference numbers. The figures merely depict examples and shall not be construed as limiting.

Figure 1:
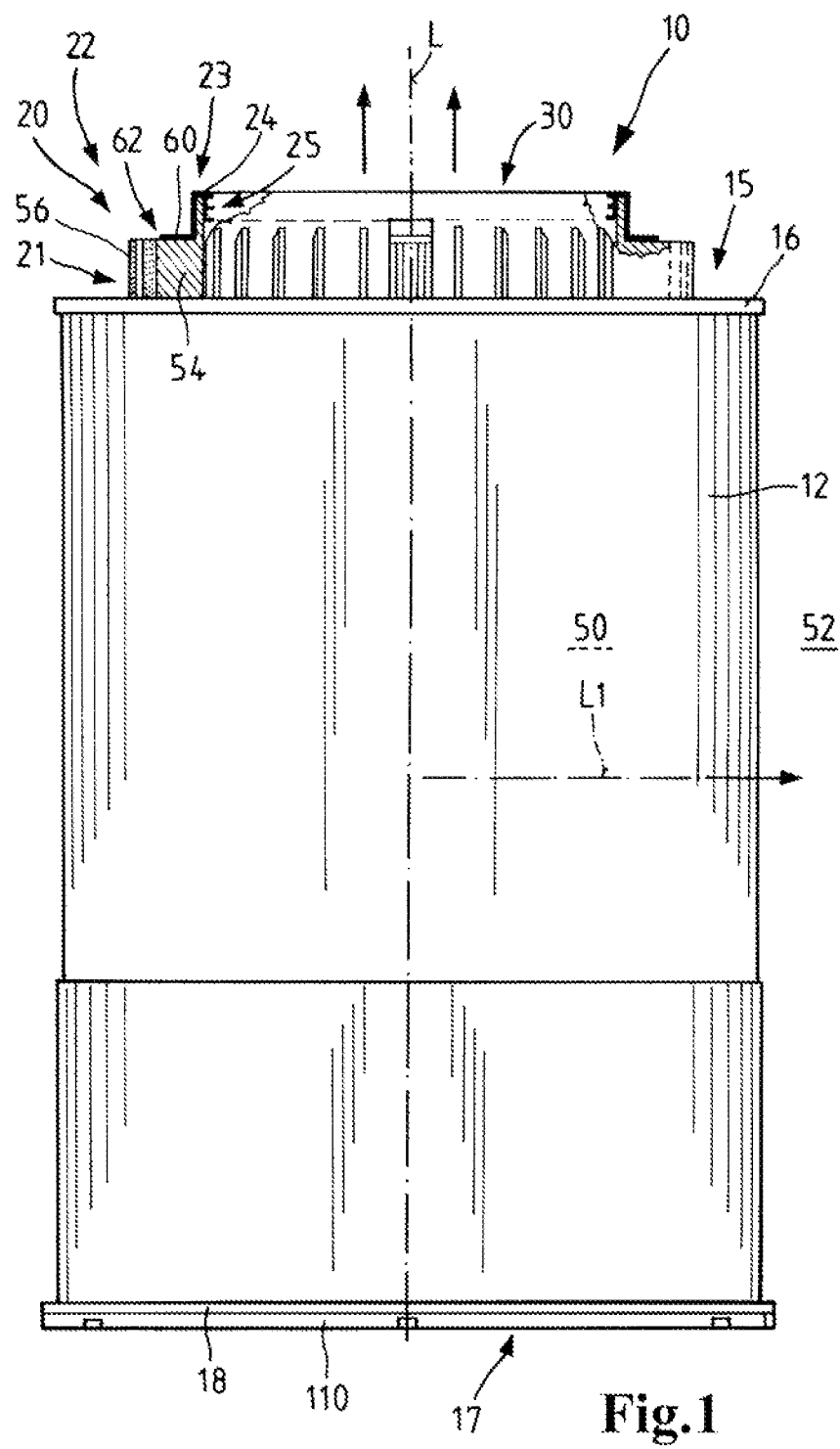
FIG. 1 is a side elevation of a filter element in accordance with one exemplary embodiment of the invention.
Figure 9:
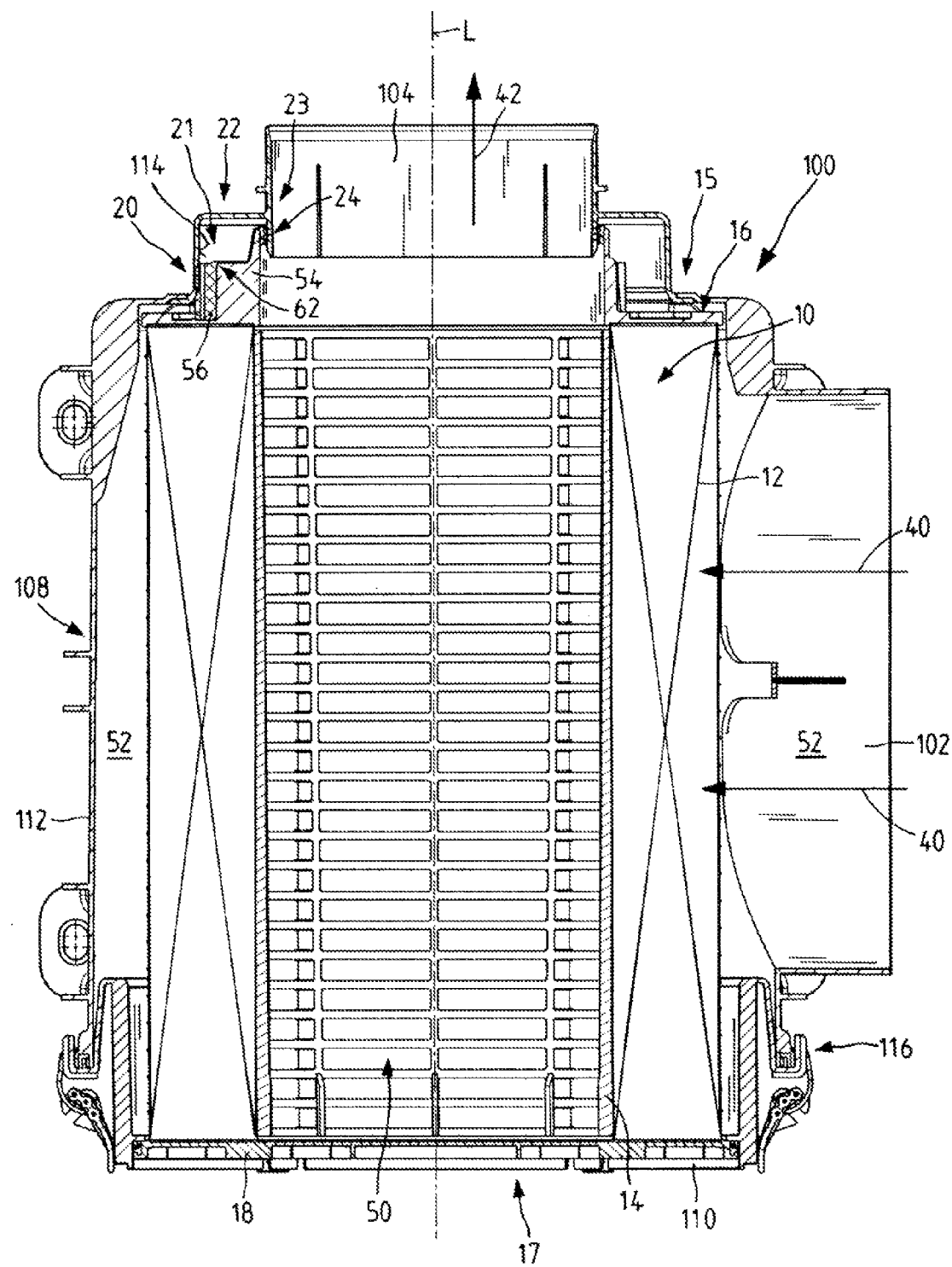
FIG. 9 is a longitudinal section through a filter system in accordance with one exemplary embodiment of the invention; and, FIG. 10 is a perspective view of a filter system in accordance with one exemplary embodiment of the invention with a tangential inlet and centric outlet.

FIG. 1 depicts a side elevation of a filter element 10 in accordance with one exemplary embodiment of the invention. The figure depicts a round filter element 10, the filter body 12 of which is closed at both end faces 15, 17 by end disks 16, 18 and which has a longitudinal axis L and is arranged between a clean side 50 and a raw side 52 of the filter element 10. A fluid, especially air, flows through the filter body 12 radially from the outside to the inside, the outlet for the filtered fluid being provided via the upper end disk 16, which to this end has a central outlet aperture 30. The filter element 10 may be securely fixed in the housing 108 of a filter system 100 via the end disk 18 using the cover 110 (see FIG. 9). At its upper end, the filter body 12 is closed by the end disk 16, which has an outlet aperture 30 for discharging the filtered fluid and therefore is sealed against the housing 108 (FIG. 9). The end disk 16 has a sealing arrangement 22 for sealing between the clean side 50 and the raw side 52 of the filter element 10 auf, wherein the sealing arrangement 22 has a radially sealing sealing area 23 and a separate retaining area 20 that acts as a radially extending movable bearing. The sealing area 23 has a circumferential seal 24 that includes at least one sealing lip 25, preferably three sealing lips 25, so that during installation in a housing 108 the clean side 50 of the filter element 10 may be sealed against the raw side 52. The retaining area 20 has a plurality of retaining elements 21, each with a support element 54 and a buffer element 56 that run radially in direction L1. The buffer element 56 is arranged on a radially extending free end 62 of the at least one retaining element 21.

The end disk 16 and the support element 54 may usefully be formed from a hard plastic and the buffer element 56 and the damping elements 60 may be formed from an elastomer. The sealing area 23 may have a linear increase in force, while the retaining area 20 may have a progressive increase in its retaining force so that the seal 24 is advantageously unloaded by the retaining area when the sealing lips come against the stop due to vibrations or tolerances.

Figure 2:
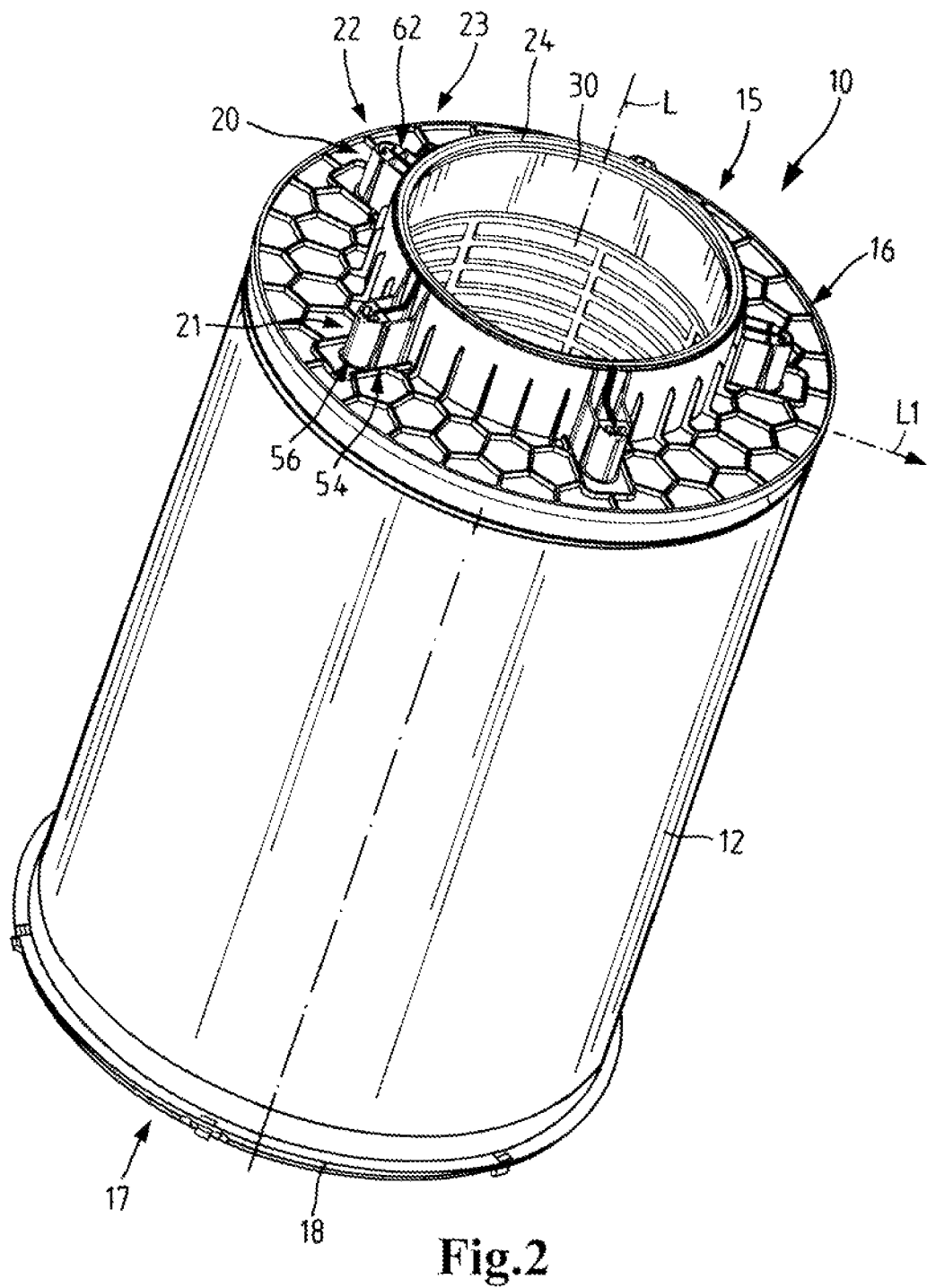
FIG. 2 is a perspective elevation of a filter element in accordance with one exemplary embodiment of the invention, looking at the sealing arrangement.

FIG. 2 is a perspective elevation of a filter element 10 in accordance with on exemplary embodiment of the invention, looking onto the sealing arrangement 22. The sealing arrangement 22 is attached to the end face 15 of the end disk 16 and comprises the sealing area 23, which is embodied as a centric collar about the longitudinal axis L and the central outlet aperture 30. The retaining area 20 comprises five retaining elements 21 that lead in radial direction L1 from the collar of the sealing area 23 outward and during installation in a housing 108 may be positioned against a counter-surface 114 of the housing wall 112. The filter element 10 may also be positioned via the retaining elements 21 during installation into the housing wall 112 by shaping the counter-surface 114 appropriately so that the filter element 10 is no longer able to turn after installation into the housing wall 112.

Figure 3:
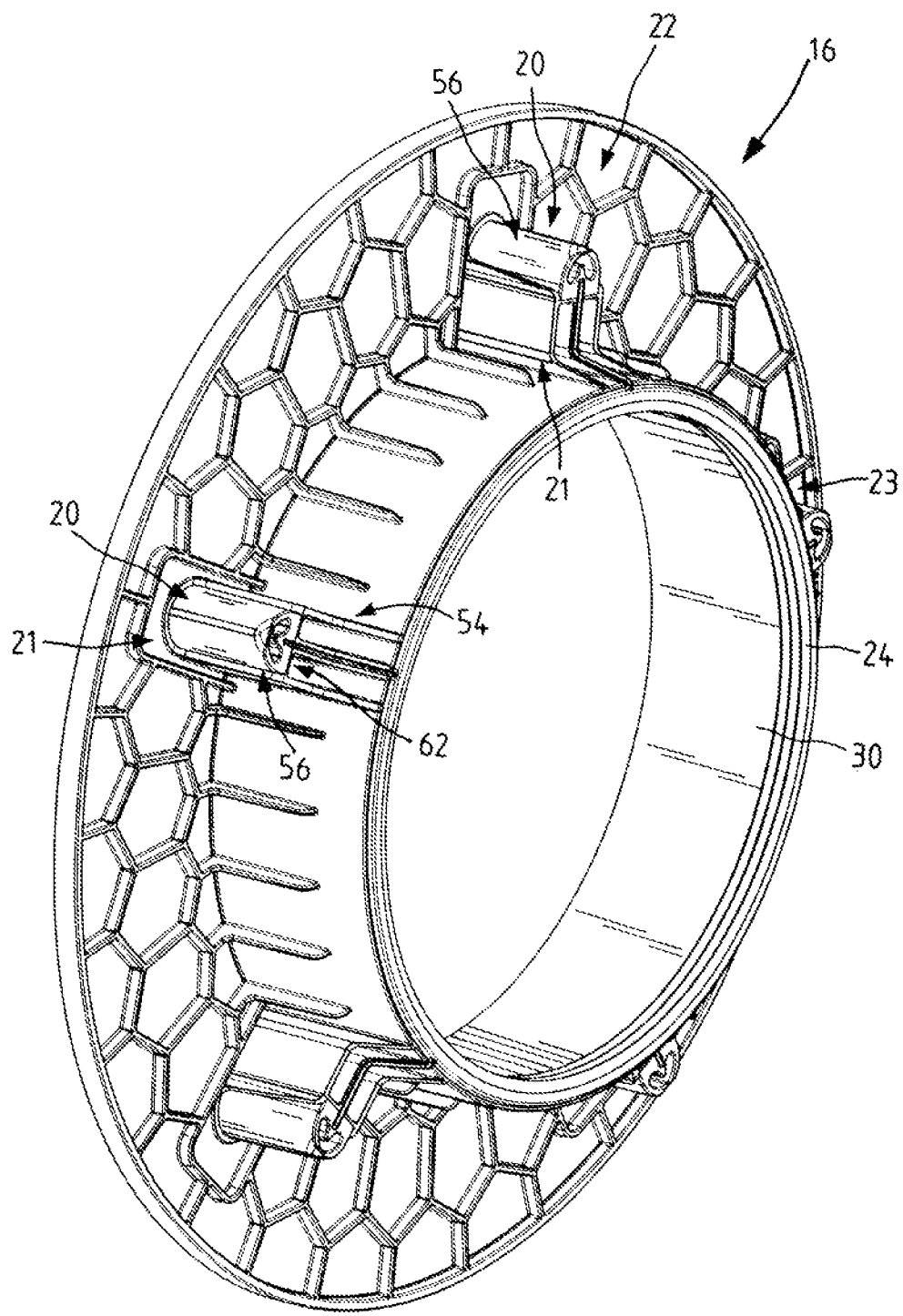
FIG. 3 is a perspective elevation of a sealing arrangement in accordance with one exemplary embodiment of the invention.

FIG. 3 is a perspective elevation of a sealing arrangement 22 in accordance with one exemplary embodiment of the invention. The five retaining elements 21, which comprise the support element 54 and the buffer element 56 arranged at the end 62, are distributed radially in a circle on the circumference of the end disk 16. At its free end, the sealing area 23, which is embodied as a centric collar about the outlet aperture 30, has the seal 24 facing radially outward.

Figure 4:
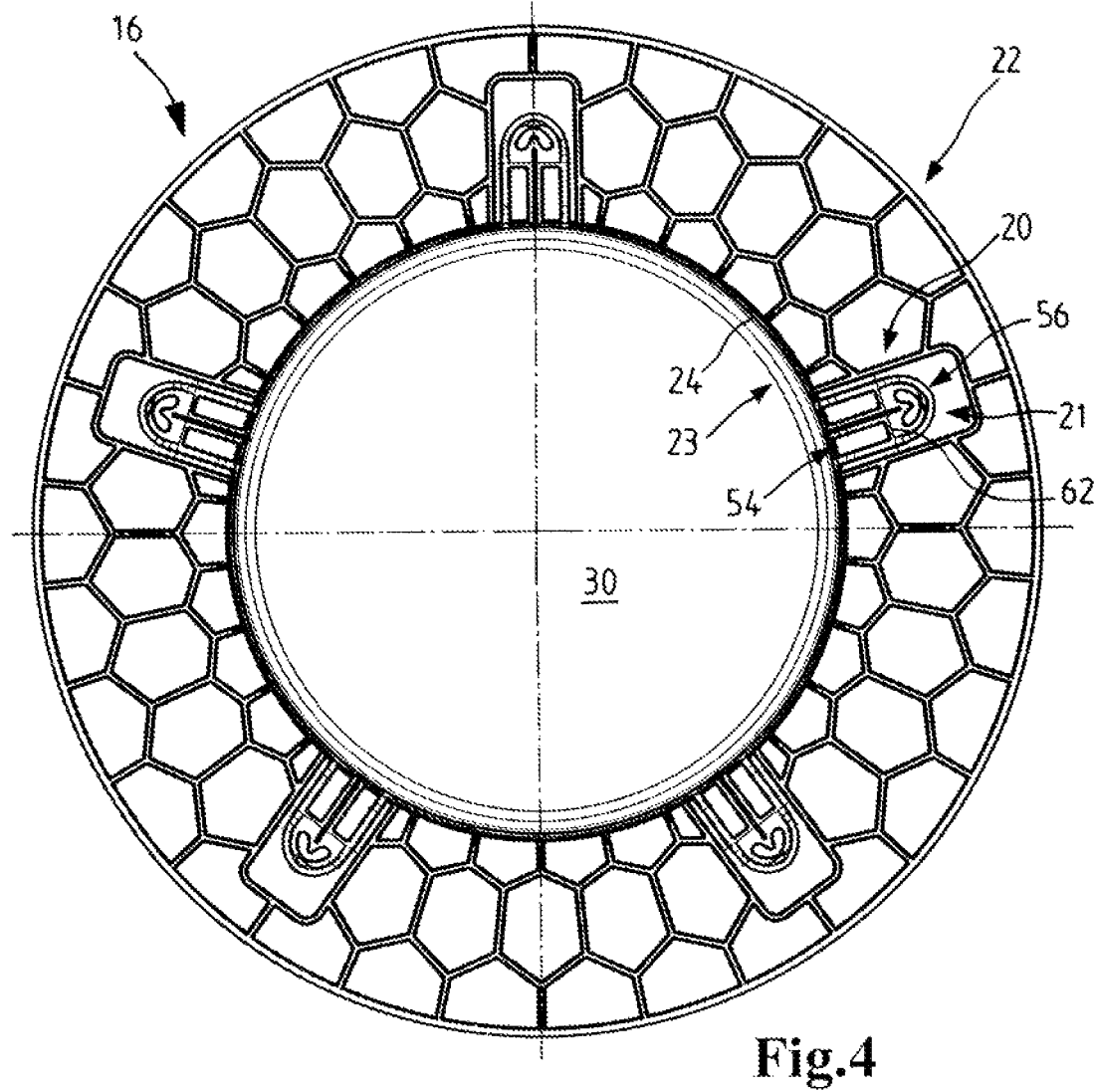
FIG. 4 is a top view of a sealing arrangement in accordance with one exemplary embodiment of the invention.

FIG. 4 provides a top view onto the sealing arrangement 22 in accordance with one exemplary embodiment of the invention. The star-like arrangement of the retaining elements 21 may be seen; this arrangement promotes the simplest possible mounting of the filter element 10 when it is inserted into the housing 108 by pre-centering the filter element 10.

The retaining area 20 could have additional retaining elements 21 having different lengths axially and/or radially in order to promote, using the poka-yoke principle, a defined position when the filter is mounted in the housing. The retaining elements 21 in FIG. 4 are all the same length, however.

Figure 5:
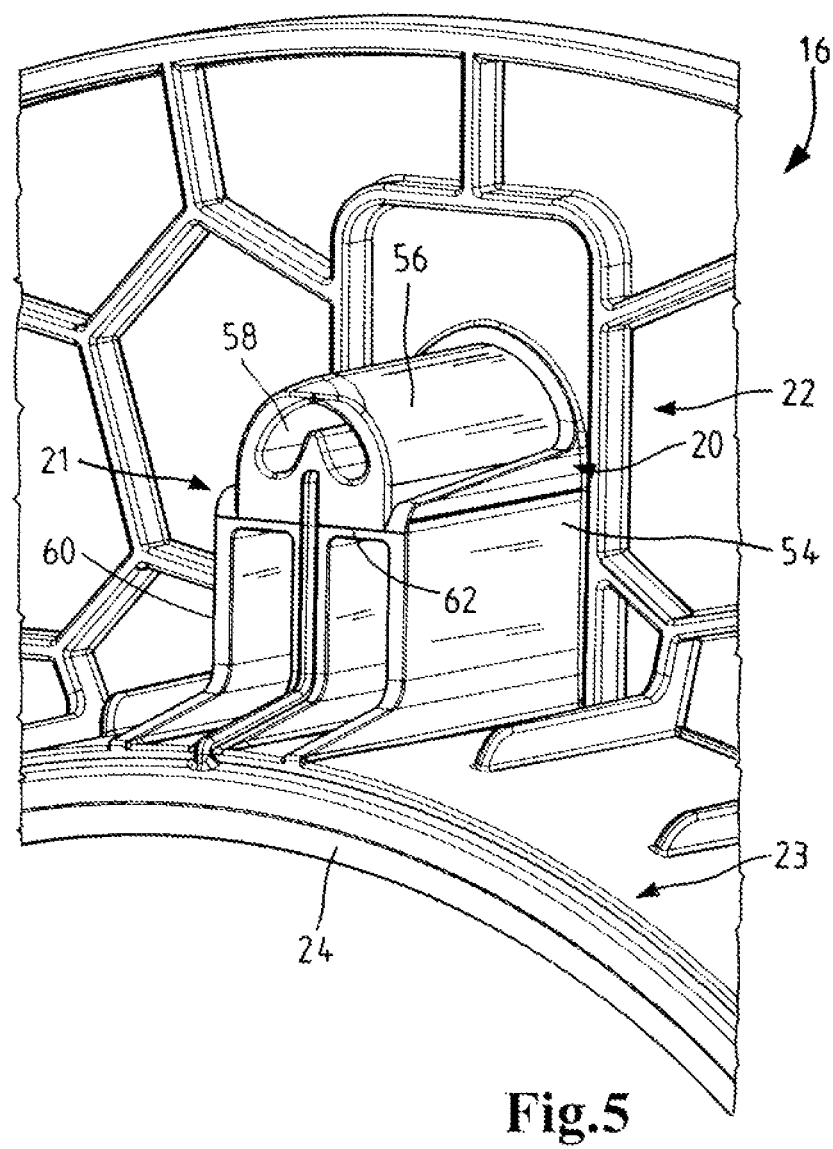
FIG. 5 is a perspective elevation of a retaining element in accordance with one exemplary embodiment of the invention.

FIG. 5 also provides a perspective elevation of a retaining element 21 in accordance with one exemplary embodiment of the invention. The retaining element 21, which comprises support element 54 and buffer element 56, leads radially away from the sealing area 23. The buffer element 56 includes an interior chamber 58 for damping when the buffer element 56 is positioned against a radially-provided counter-surface 114 of the housing wall 112. The retaining element 21 includes axial damping elements 60 that are attached as elastomer strips running radially on the support element 54 and that may provide additional damping, both axially and radially, when positioned against a counter-surface 114. The sealing lips 25 of the seal 24 are oriented radially inward in this exemplary embodiment.

Figure 6:
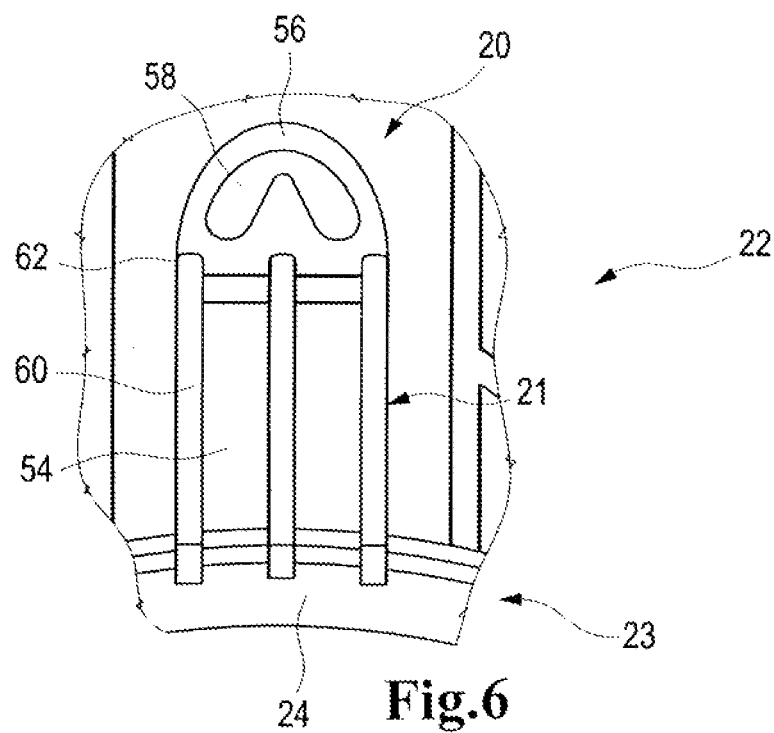
FIG. 6 is a top view of a retaining element in accordance with one exemplary embodiment of the invention.

FIG. 6 is a top view onto a retaining element 21 in accordance with one exemplary embodiment of the invention. It may clearly be seen that the buffer element 56 includes an interior chamber 58 for damping when the buffer element 56 is positioned against a radially provided counter-surface 114 of the housing wall 112, which counter-surface permits the buffer element to be compressed radially so that an effective damping function may be performed.

Figure 7:
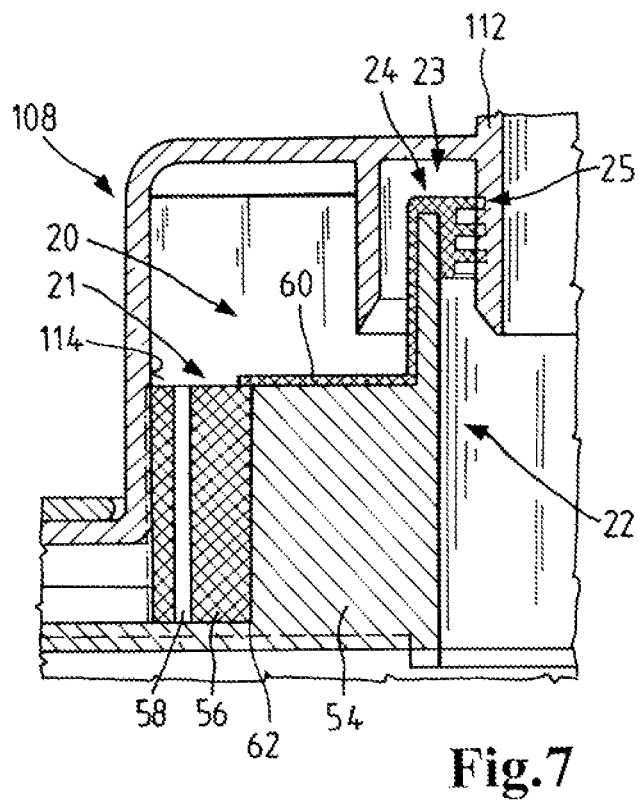
FIG. 7 is a section through the retaining element in accordance with one exemplary embodiment of the invention.

FIG. 7 is a section through a retaining element 21 in accordance with one exemplary embodiment of the invention. It may be seen that the sealing arrangement 22 includes a sealing area 23 that has a seal 24 with three sealing lips 25 that are oriented radially inward and are positioned against a counter-surface 114 of the housing wall 112. The sealing arrangement furthermore includes a retaining area 20 that has a retaining element 21 that comprises a support element 54 as an essential support function and on the radially outwardly oriented end 62 of the support element 54 comprises a buffer element 56 for radial damping when radially supported against counter-surface 114. The chamber 58, which is added to the buffer element 56 for additional damping, may be seen in the section. The retaining element 21 includes axial damping elements 60 that are attached running radially as elastomer strips on the support element 54 and that may provide additional damping, both axially and radially, when positioned against a counter-surface 114.

Figure 8:
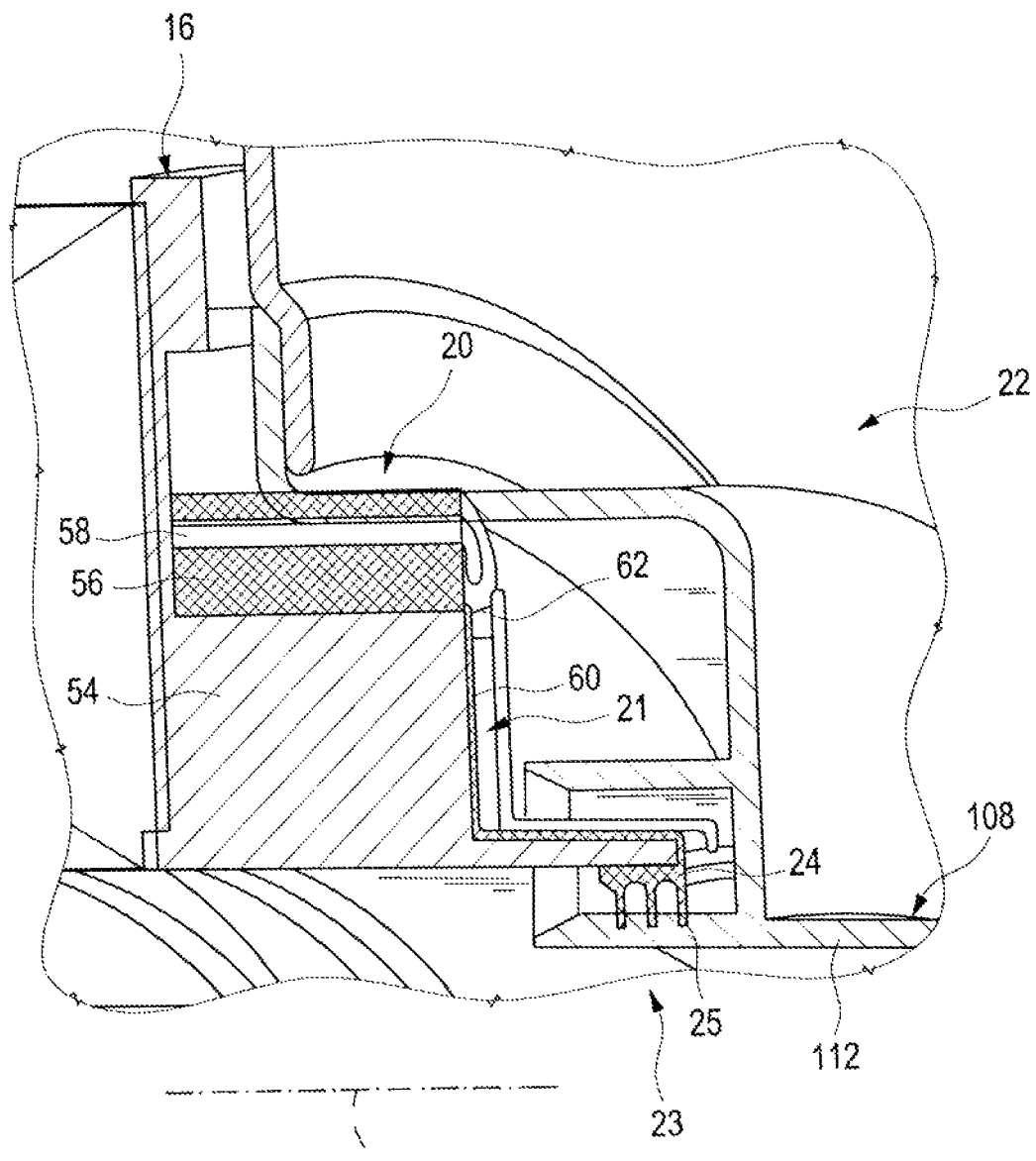
FIG. 8 is an excerpt from a section through a filter system depicting the cooperation of retaining element and seal with the housing wall in accordance with one exemplary embodiment of the invention.

FIG. 8 is an excerpt from the section through a filter system 100 that focuses on the cooperation of retaining element 21 and seal 24 with the housing wall 112 in accordance with one exemplary embodiment of the invention. The filter element 10 is positioned against the counter-surface 114 of the housing wall 112 via the buffer element 56. The movable bearing permits movement in the axial direction L. The seal 24, which in this exemplary embodiment has three sealing lips 25 oriented radially inward, is positioned against an interior side of the housing wall 112 and thus performs the sealing function. It may be seen that the penetration of the housing wall 112 through the buffer element 56 is an artifact of the CAD rendering. In reality, the buffer element 56 is pressed against the counter-surface 114 of the housing wall 112 and can thus perform its damping function.

FIG. 9 is a longitudinal section through a filter system 100 in accordance with one exemplary embodiment of the invention. A filter element 10 is mounted in the housing 108, which comprises housing wall 112 and cover 110. The filter element 10 is inserted into the housing wall 112 until the end disk 16 of the former has reached its seat with movable bearing at the outlet-side end 104 of the housing wall 112. Then the cover 110 is placed onto the housing wall 112 and end disk 18, wherein the end disk 18 is securely borne in the cover 110. The housing 108 is securely closed, for instance, with the cover 110 via flip-top closures 116 that are positioned on the housing wall 112. Closing the cover 110 presses the filter element 10 into its seat in the housing, securely radially clamps it via the retaining area 20, and seals it radially against the housing 108 using the sealing area 23 of the sealing arrangement 22. The seal 24 seals the clean side 50 against the raw side 52.

The embodiment of the filter element 10 is as described in FIG. 1. The interior structure of the filter element 10 may be seen in the section. The interior structure includes a filter body 12 in the shape of a hollow cylinder and a support tube 14 for stiffening the filter body 12. The space inside the filter body 12 represents the clean side 50, wherein the fluid path 40, 42 for the fluid to be filtered runs via the inlet 102 into the housing 108 through the filter body 12 radially from exterior to interior, while the exterior of the filter body 12 embodies the raw side 52.

It is possible to attach to the clean side 50 of the filter element 10 inside the support tube 14 a secondary element 28 (not shown) that essentially comprises a supporting structure with a relatively porous filter medium, for instance a non-woven fabric, and that during exchange of the filter element 10 remains in the housing 108 for protecting further guidance of the air, for instance of an internal combustion engine, against penetrating dust particles and other objects. The secondary element 28 may be securely screwed to the outlet-side part of the housing 108 via screws or snap-on connections, for instance.

Figure 10:
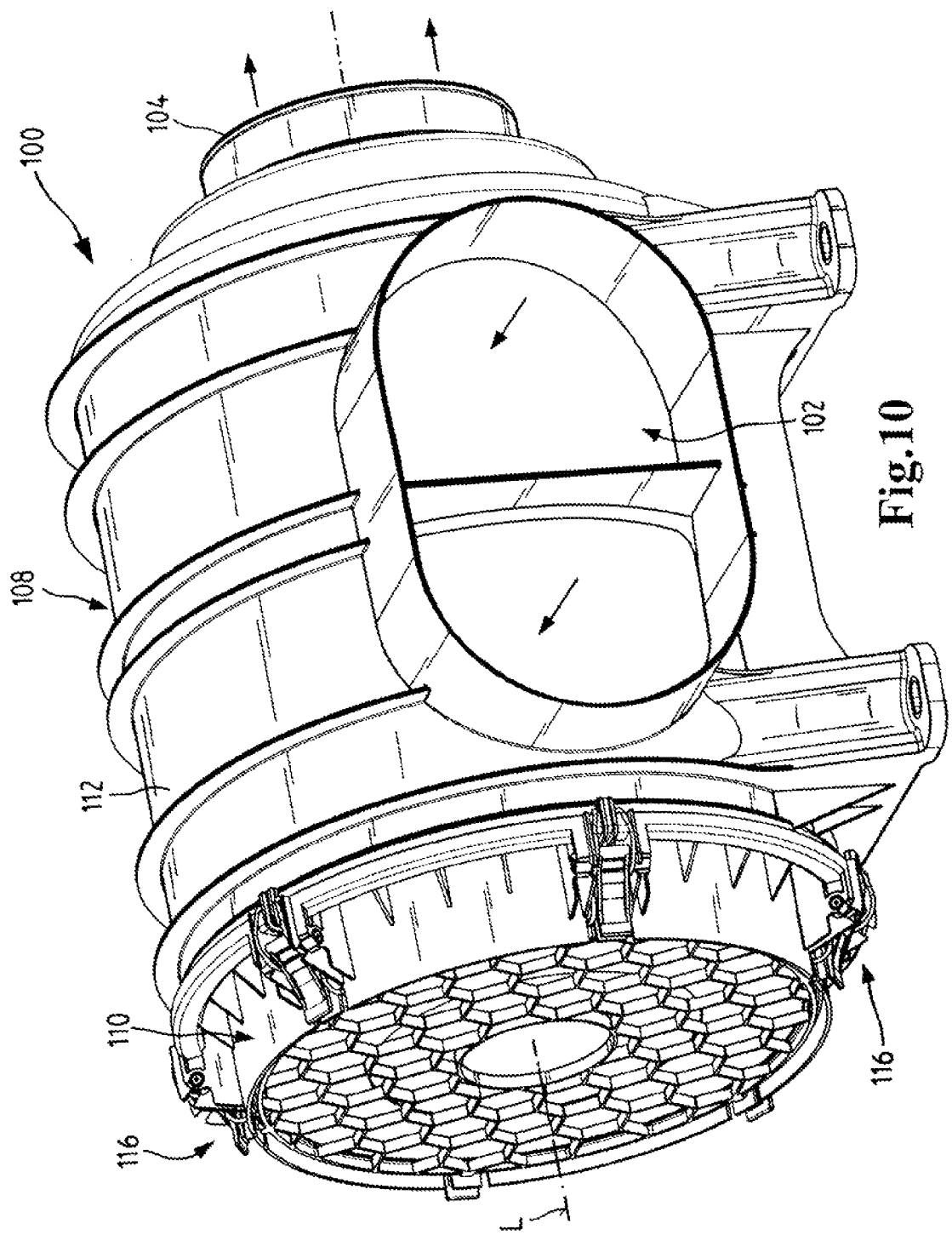

FIG. 10 is a perspective elevation of a filter system 100 in accordance with one exemplary embodiment of the inventive having a tangential inlet 102 and centric outlet 104 at a housing end face. A round filter structure that comprises a housing 108 that is closed with a cover 110, for instance via flip-top closures, is depicted.

When used as an air filter system, dust-laden air flows into the inlet 102, which is arranged tangential to the installed air filter element so that in the interior of the housing 108 the air is replaced by an inflow protection element on the filter element in a rotational movement. Filter element and inflow protection element are not shown in the drawing. The cleaned air may be discharged from the housing 108 via the centric outlet 104.

The filter element 10 may be employed as an air filter, especially as an air filter for an internal combustion engine. However, in principle it may also be used as a particle filter in a similar structural form.

What is claimed is:
1. A filter element, comprising:
a filter body having a longitudinal axis (L), the filter body arranged between a clean side and a raw side of the filter element; and
at least a first end disk arranged on an end face of the filter body;
wherein the end disk has a sealing arrangement for sealing between the clean side and the raw side;
wherein the sealing arrangement has a radially sealing sealing area and a separate retaining area that acts as a moveable bearing;
wherein the retaining area has at least one retaining element with a support element and a buffer element;
wherein the buffer element includes an interior chamber for damping when the buffer element is positioned against a counter-surface provided in the radial direction.
2. The filter element according to claim 1, wherein
the sealing area has a circumferential seal that includes at least one sealing lip, so that, when being installed in a housing, the clean side of the filter element may be sealed against the raw side.
3. The filter element according to claim 1, wherein
the buffer element is arranged on a free, radially extending end of the at least one retaining element.
4. The filter element according to claim 1, wherein
the at least one retaining element includes damping elements in the axial direction.

5. The filter element according to claim 4, wherein
the at least one end disk and the support element are formed from a hard plastic; and
wherein the buffer element and the damping elements are formed from an elastomer.
6. The filter element according to claim 1, wherein
the sealing area has a linear increase in force as a pressing force increases.
7. The filter element according to claim 1, wherein
the retaining area has a progressive increase in its retaining force.
8. The filter element according to claim 1 wherein
the filter element is configured as an air filter for an internal combustion engine.
9. A filter element, comprising:
a filter body having a longitudinal axis (L), the filter body arranged between a clean side and a raw side of the filter element; and
at least a first end disk arranged on an end face of the filter body;
wherein the end disk has a sealing arrangement for sealing between the clean side and the raw side;
wherein the sealing arrangement has a radially sealing sealing area and a separate retaining area that acts as a moveable bearing;
wherein the retaining area has at least one retaining element with a support element and a buffer element;
wherein the retaining area has retaining elements each with different lengths axially and or radially than other retaining elements.
10. The filter element according to claim 9, wherein
the buffer element includes an interior chamber for damping when the buffer element is positioned against a counter-surface provided in the radial direction.
11. A filter system, comprising:
a housing with housing wall and with a cover;
wherein within an interior of the housing wall in the radial direction has a counter-surface;
an inlet arranged on the housing supplying a fluid to be filtered;
an outlet arranged on the housing for removing filtered fluid;
a filter element arranged in the housing and separating the inlet from the outlet, wherein the filter element further includes
a filter body with a longitudinal axis (L) that is arranged between a clean side and a raw side;
an end disk arranged on an end face of the filter body;
wherein the end disk has a sealing arrangement sealing between the clean side and the raw side;
wherein the sealing arrangement has a radially sealing sealing area and a separate retaining area that acts as a movable bearing;
retaining elements arranged on the retaining area and positioned radially supportable against the counter-surface of the housing wall;
wherein the retaining area has at least one retaining element with a support element and a buffer element;
wherein the buffer element includes an interior chamber for damping when the buffer element is positioned against the counter-surface provided in the radial direction;
wherein the filter element is exchangeably arranged within the interior of the housing of the filter system.

12. The filter system according to claim 11, further comprising
a secondary element arranged within the housing on the clean side.

13. The filter system according to with claim 12, wherein the secondary element is mounted within the housing;
wherein the secondary element remains in the housing when the exchangeable filter element is removed and exchanged.

* * * * *